United States Patent [19]

Close

[11] Patent Number: 4,822,835

[45] Date of Patent: Apr. 18, 1989

[54] ADHESIVE SYSTEM

[75] Inventor: Donald S. Close, Stow, Ohio

[73] Assignee: Syn-Coat Enterprises, Inc., Stow, Ohio

[21] Appl. No.: 200,511

[22] Filed: May 31, 1988

[51] Int. Cl.4 ............................................. C08G 18/00
[52] U.S. Cl. .................................. 524/114; 524/188; 524/361; 525/453
[58] Field of Search ...................... 524/114, 188, 361; 525/453

[56] References Cited

U.S. PATENT DOCUMENTS 4,762,887  8/1988  Griswold et al. .................. 525/453

Primary Examiner—Maurice J. Welsh
Attorney, Agent, or Firm—Oldham & Oldham Co.

[57] ABSTRACT

Adhesive systems particularly useful for adhering epichlorohydrin elastomers, comprise solutions of urethane polymers, amino silane coupling agents, and epoxy silane coupling agents in organic solvents.

7 Claims, No Drawings

ADHESIVE SYSTEM

TECHNICAL FIELD

This invention relates to adhesive systems for securely joining materials, especially certain elastomeric materials. More particularly, this invention relates to liquid adhesive systems useful for forming strong bonds between articles, particularly sheets of epichlorohydrin rubber. Specifically, this invention relates to adhesive systems comprising solvent solutions of certain silane compounds, in combination with urethane polymers.

BACKGROUND OF THE INVENTION

The search for materials having desirable and unique properties has led to the creation of a vast number of new, synthetic compositions, and these in turn, have given rise to a new generation of fabricated products. In many instances, fabrication of the materials into commercial products has necessarily involved the use of adhesives in order to allow the materials to be secured to themselves, or to still other materials. Not too surprisingly, the older adhesives systems have in may cases proven to be incompatible with the new materials, or otherwise unsatisfactory, and in numerous instances, the adhesions obtained have been of marginal or unsatisfactory quality. The reasons for such failures are not always clearly understood, partly because in many respects, the mechanics of adhesion is often more of an art than a science. As may be imagined, a secure and reliable bond is frequently of critical importance, and adhesive systems able to provide such bonds with the newly developed products are constantly being sought.

Furthermore, in recent years society has become aware of the need to avoid contamination of its environment if adverse health, and other undesirable ecological effects are to be avoided. In the case of the storage of liquids, for example, where large tanks are used to hold potentially polluting materials such as gasoline, diesel fuel, or other liquids hazardous to the environment, such tanks are frequently provided with emergency spill protection, for instance lined diked enclosures. In addition, where earthen pits are provided for inexpensive storage of materials whose escape must be prevented, a lined enclosure is commonly provided to avoid the possibility that the contained materials will seep into the surrounding soil. Epichlorohydrin rubber sheeting has often been used for this purpose, in part, because of its oil and weather resistance, characteristics which enable it to give long-term service under severe conditions. Such liners are frequently fabricated in modular sheets, which are joined at overlapping seams by means of adhesives. Unfortunately, however, epichlorohydrin rubber is particularly difficult to fasten with adhesives, and many of the adhesive systems heretofore utilized for the purpose have proven to be inadequate for the task.

DISCLOSURE OF THE INVENTION

It is a first aspect of this invention, therefore, to provide a system which is useful in fastening objects together by adhesion.

It is a second aspect of this invention to provide an adhesive system which allows sheets and other items formed from epichlorohydrin rubber to be fastened to each other, or to other materials.

It is a further object of this invention to provide an adhesive system which is easy to prepare, and one which is readily applied.

Still another object of the invention is to furnish an adhesive system which produces exceptionally strong bonds with epichlorohydrin rubber, and which has a relatively long storage life.

An additional aspect of the invention is to provide adhesive joints which maintain their sealing integrity even when exposed to hydrocarbon liquids such as gasoline and diesel oil.

The foregoing and other aspects of the invention, as will become clear in the following detailed description of the invention, are provided by an adhesive composition comprising in combination:

a urethane polymer;

at least one amino silane coupling compound which includes at least one amino group as a part thereof;

at least one epoxy silane coupling compound which includes at least one epoxy group as a part thereof, and an organic solvent for such compounds and polymers.

The foregoing and still other objects of the invention are provided by the process of adhesively fastening objects together with the adhesive composition of the preceding paragraph.

DETAILED DESCRIPTION OF THE INVENTION

The adhesive system contemplated by the invention comprises a liquid solution of a urethane polymer, an amino silane coupling compound, and an epoxy silane coupling compound, all of which are dissolved in an organic solvent. The solution described is spread on the surface of the objects to be fastened, and the same are then joined, all as described hereinafter.

A variety of silane coupling agents may be used for the purposes of the invention; however, coupling agents having the general formula $RCH_2CH_2CH_2 Si(OCH_3)_3$ have been found to be particularly useful. The trimethoxysilyl portion of the molecule may be modified if desired, and the R may be a reactive organic group, selected to match the reactivity of the system in which it will be used. Furthermore, the organofunctional group will normally be separated from the silicon atom by at least three carbon atoms in order to preserve its reactivity. In the case of the invention, it has been found necessary to include a mixture of such silane coupling agents, at least one of which includes at least one amine group in the reactive organic group, while at least one other silane must include at least one epoxy group in the reactive organic group. The coupling agent undergoes hydrolysis in the presence of water and an acid or base catalyst in the process of use. The reaction involved is believed to be as follows:

$-Si(OCH_3)_3 + 3H_2O \; Si(OH)_3 + 3CH_3OH$ the water for hydrolysis may come from sources such as the other components in the adhesive system, from the atmosphere, from the substrates being joined, or may be added to the system. Likewise, the components involved in the process of adhesion normally, advantageously, have contained therein materials capable of catalyzing the reaction; consequently, no special techniques are required to promote the hydrolysis reaction.

Among suitable compounds may be mentioned, for example, those manufactured and marketed by DOW CORNING under the designation Z-6020; Z-6040; Z-2-2023, and others, being represented, respectively, by the formulas H$_2$N(CH$_2$)$_2$HN(CH$_2$)$_2$Si(OCH$_3$);CH$_2$CHCH$_2$O(CH$_2$)$_3$Si(OCH$_3$)$_3$, and H$_2$N(CH$_2$)$_2$HNCH$_2$CH(CH$_3$)CH$_2$Si(OCH$_3$)$_2$.

The polyurethanes suitable for the invention include any of the polyurethanes commonly available to the trade, including those of the aromatic polyester, polycaprolactone, and polyether types, etc., for example those sold by K. J. Quinn and Company, Inc. of Malden, Mass. under the designations, respectively, PR-63, PA93-500, and PA58-502, as well as other urethane polymers.

Solvents suitable for use with the adhesive systems of the invention may include any solvents, or mixtures of solvents, of the kind capable of dissolving the silane compounds and urethane polymers contemplated by the invention. Particularly useful, however, are solvents which include ketones such as for example acetone, methyl-ethyl ketone, mixtures of ketones, by themselves, or with other compounds such as, for example, benzene, toluene, and the like.

While as previously stated, the mechanism of adhesion is uncertain, it appears that it may well involve some chemical interaction of the silane and urethane components, among themselves, and possibly with the substrates being adhered. Whatever the mechanism, it has been found necessary to have at least one amine silane, and at least one epoxy silane coupling agent present. While the amount of each of the silane coupling agents may vary with respect to the amount of urethane polymer present, it has been found desirable to have each of said silane types present in an amount at least equal to about 0.1%, by weight, of the urethane polymer present. A single type of amino silane may be combined with a single type of an epoxy silane, or any of various mixtures of epoxy and amino silanes may be used. Advantageously, about equal weights of the amino and epoxy silanes will be combined in the adhesive system, although other weight ratios may be employed if desired. While the total amount of silanes, on a weight basis, relative to the urethane polymer present should equal at least about 0.2%, the use of more than about 10% is difficult to justify. Furthermore, in most instances, the use of no more than about 2% will provide superior adhesion of the components being joined.

The solvent system is readily applied by brushing, rolling, or spraying the adhesive on the surfaces to be adhered, after which the coated surfaces are joined. A particularly effective technique involves coating the surfaces, allowing the contained solvent to evaporate to the point where a "tack" or semi-dry stickiness develops, after which the surfaces are joined, and if desired, compressed with a roller or by weights. In the event the surface becomes too dry, due to the evaporaiton of too much of the solvent present, the tack of the adhesive can be restored by the application of additional solvent to the coating, or alternatively, the surfaces can be joined without the application of further solvent and forcefully mated by the application of pressure, preferably accompanied by heating.

The amount of solvent used will depend upon the nature of the solvent, as well as the types of urethane polymer and silane coupling agents making up the adhesive system. Also important is the method of application of the adhesive, whether by roller, brush, or spraying. Normally, however, it has been found that the use of from about 70% to 95%, by weight, of solvent, based on the total weight of the adhesive solution, provides a solution viscosity which makes application of the adhesive system to the materials to be joined easy to accomplish.

Although other methods may be used to prepare the solution, the urethane polymer, generally in granular form although other forms may also be used, is added to the solvent in a suitable container, and the mixtures stirred until a solution is obtained. The silane components, normally liquid at room temperature, are then added to the polymer-solvent solution, either in their pure form, or also dissolved in a suitable solvent. The mixture is thereafter stirred further until a uniform solution is obtained, after which it is ready for use. If desired, heat may be applied to accelerate the solution process.

The invention will be better understood in connection with the following examples which are not intended to be limiting in nature, but merely exemplary of the best mode for carrying out the invention.

EXAMPLE 1

A 20% by weight solution of polyurethane in methyl-ethyl ketone is prepared by first adding the polymer to the solvent, and then stirring the mixture until solution of the latter is achieved. Thereafter, 20% solutions of an amino silane and an epoxy silane, respectively, are prepared in a similar manner. The amino silane employed is a Z-6020, and the epoxy silane is a Z-6040, both products being marketed by Dow Corning. While the polyurethane is a PS 82, marketed by K. J. Quinn. Following preparation of the solutions described, the solutions are combined to form an adhesive system of the invention, after which they are spread on a sheet of epichlorohydrin rubber, 0.060 inch thick, by means of a paint brush. After fifteen minutes of partial drying by exposure to the air, the two portions of the adhesive coated sheet are pressed together and rolled with a wooden roller. No weights are applied to the bonded area, since the natural tack of the adhesive is sufficient to create a bond.

After aging for one week at ambient room temperature, the bonded sheets are cut into strips one inch wide, and are subjected to a Peel Strength Test according to the test method of ASTM D-413, conducted at room temperature.

Four sets of samples are prepared according to the above-described procedure, having compositions as shown in the following table, in which the numbers indicated are parts-by-weight of the ingredient referenced.

TABLE 1

| Component | A | B | C | D |
|---|---|---|---|---|
| Quinn PS 82 Polyurethane | 100 | 100 | 100 | 100 |
| Dow Corning Z-6020 Amino Silane | — | 5 | — | 2.5 |
| Dow Corning Z-6040 Epoxy Silane | — | — | 5 | 2.5 |

Samples tested include a first set of samples aged in air, and a second set aged while submerged in diesel fuel. Peel strengths obtained at room temperature are as follows, in which the values shown indicate strength in pounds per lineal inch.

TABLE 2

| Sample | Air Aging (#/lineal in.) | Diesel Fuel Aging (#/lineal in.) |
|---|---|---|
| A | 26.3 | 27.2 |
| B | 25.2 | 26.1 |
| C | 25.2 | 28.3 |
| D | 35.8 | 35.1 |

The experiment shows that a 30% increase in bond strength is achieved with Sample D, in which approximately equal amounts of the amino silane and the epoxy silane were present. The increased bond strength is achieved even though the total weight of silane employed is the same as in the case of Samples B and C. Interestingly, the bond strength of the Samples B and C, which employed only one type of silane, are actually slightly inferior to Sample A in which no silane was present. The results clearly demonstrate a synergistic action between the amino silane and the epoxy silane, possibly as the result of an interaction between the two silanes, the polyurethane, and the epichlorohydrin.

EXAMPLE 2

A further set of bonded epichlorohydrin test samples is prepared as described in Example 1, employing an adhesive system of the invention comprising a 20% solution of the following ingredients in methyl-ethyl ketone. The numbers shown are given as parts-by-weight of the component referenced.

TABLE 3

| Component | 99A | 99B | 99C |
|---|---|---|---|
| PS 83 Polyurethane | 100 | 100 | 100 |
| Z-6020 Amino Silane | 1.0 | 1.6 | 2.0 |
| Z-6040 Epoxy Silane | 1.0 | 1.6 | 2.0 |

As noted in the following table, tests run on the samples include both the peel tests run in Example 1, as well as lap sheer test performed in accordance with ASTM procedure C-961, the latter test values being shown in pounds per square inch. A variety of test conditions, as noted in the column headings are employed, including aging and testing in air at ambient room temperature conditions; aging in air at 158° F., followed by testing at that temperature; and tests conducted at room temperature after submersion at ambient temperatures for two weeks in diesel fuel, unleaded gas, and water. The following results are obtained.

| | PEEL ADHESION (#/lineal inch) | |
|---|---|---|
| Sample | Air Aging (age/test-room temperature) | Air Aging (age/test-158° F.) |
| 99A | 21.5 | 6.6 |
| 99B | 30.5 | 8.9 |
| 99C | 22.5 | 5.4 |
| Diesel Fuel Aging (age/test-room temperature) | Unleaded Gas Aging (age/test-room temperature) | Water Aging (age/test-room temperature) |
| 25.0 | 8.5 | 22.5 |
| 20.0 | 14.0 | 26.0 |
| 27.0 | 11.0 | 22.2 |

LAP SHEET TEST RESULTS (PSI)

| Sample | Air Aging (age/test-ambient) |
|---|---|
| 99A | 94.0 |
| 99B | 66.5 |
| 99C | 94.5 |
| Air Aging (age/test-158° F.) | Diesel Fuel (age/test-room temperature) |
| 22.0 | 90.0 |
| 26.0 | 66.0 |
| 22.5 | 94.0 |

From the above results it can be seen that the influence of the silane loading level relative to the urethane polymer, is dependent upon the service to which the bond is to be subjected, and at least in some instances, the bond strength exhibits an inflection point that sometimes constitutes a maximum value, and in other cases a minimum value. The experiment demonstrates the value of testing a series of loadings of the adhesive system selected under the conditions which the system is expected to be exposed to. Such testing is well within the ability of those skilled in the art, and will serve to help in the selection of the particular system most likely to optimize the strength of the bond obtained.

EXAMPLE 3

A still further set of samples were prepared according to the procedure of Example 1 from epichlorohydrin rubber sheeting, using an adhesive system containing the types and amounts of components shown in the following table. The systems shown comprise a solution, which on a weight basis, contain 20% by weight of the indicated components dissolved in methyl-ethyl ketone. The values listed indicate the amount of the component present, also on a parts-by-weight basis.

| Component | A | B | C | D |
|---|---|---|---|---|
| Quinn 95-500 Polycaprolactone type Polyurethane | 100 | 100 | 100 | 100 |
| Dow Corning Z-6020 Amino Silane | 1 | 10 | 4 | 2 |
| Dow Corning Z-6040 Epoxy Silane | 1 | 10 | 2 | 4 |

As is the case of the other examples, the samples are subjected to peel strength tests. The procedure used is ASTM D 413, Type A, (180xF) in which a cross head speed of two inches per minute is used. The results obtained are as follows, the values shown being in pounds per lineal inch. The tests are performed after aging for one week at ambient room temperature.

| Sample* | Air Supply (#/lineal in.) |
|---|---|
| A | 26 |
| B | 25 |
| C | 23 |
| D | 22 |

*In subsequent tensile tests, all sample materials rupture, rather than experience bond failure.

While loadings greater than two parts of silane per 100 parts of urethane polymer might have produced superior bonding, the tensile strength of the bond obtained in the case of the samples exceeded the strength of the material being bonded in any event. Consequently, the use of additional silane would be unwarranted in such a system, since it would simply increase costs. In the case of the peel strengths, increases in the total silane loading appeared to have little effect on the results obtained.

The adhesive systems of the invention are particularly useful in connection with epichlorohydrin rubbers of the type having the general formula

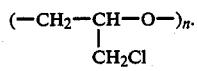

However, other types of materials, for example other elastomers, or even non-elastomeric materials such as, for instance, leather, etc. may also be fastened together by the adhesive systems disclosed.

While the invention has been described with reference to certain specific embodiments and examples, it is not to be construed as limited thereto, inasmuch as variations and modifications of the invention are possible without departing from its spirit and scope as defined in the following appended claims.

What is claimed is:

1. An adhesive composition comprising in combination:
    a polyurethane polymer;
    at least one amino silane coupling compound which includes at least one amino group as a part thereof;
    at least one epoxy silane coupling compound which includes at least one epoxy group as part thereof, and
    an organic solvent for such compounds and polymers.

2. An adhesive composition according to claim 1 wherein said amino silane coupling compound and said epoxy silane coupling compound are each present in an amount which on a weight basis constitutes at least about 0.1% of said polyurethane present.

3. An adhesive composition according to claim 2 wherein said compounds are present in about equal amounts by weight.

4. An adhesive composition according to claim 3 wherein said compounds and said polyurethane, together, comprise from about 70% to 95% of the weight of said adhesive composition.

5. An adhesive composition according to claim 1 wherein said organic solvent includes a ketone.

6. The process of adhesively fastening objects together with an adhesive composition according to claim 1.

7. The process of claim 6 wherein said objects are made from epichlorohydrin.

* * * * *